United States Patent
Imamura

(10) Patent No.: US 12,519,895 B2
(45) Date of Patent: Jan. 6, 2026

(54) REMOTE OPERATION APPARATUS CAPABLE OF RESTRICTING CONNECTION BETWEEN AN IMAGE FORMING APPARATUS AND ANOTHER REMOTE OPERATION APPARATUS, IMAGE FORMING APPARATUS, AND IMAGE FORMING SYSTEM

(71) Applicant: CANON KABUSHIKI KAISHA, Tokyo (JP)

(72) Inventor: Takeru Imamura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 18/159,528

(22) Filed: Jan. 25, 2023

(65) Prior Publication Data
US 2023/0247160 A1    Aug. 3, 2023

(30) Foreign Application Priority Data
Jan. 31, 2022    (JP) ................................ 2022-012751

(51) Int. Cl.
H04N 23/661    (2023.01)
H04N 1/00    (2006.01)

(52) U.S. Cl.
CPC ..... *H04N 1/00973* (2013.01); *H04N 1/00129* (2013.01); *H04N 1/00854* (2013.01); *H04N 1/00925* (2013.01); *H04N 2201/0075* (2013.01)

(58) Field of Classification Search
None
See application file for complete search history.

(56) References Cited

U.S. PATENT DOCUMENTS

| | | | |
|---|---|---|---|
| 2009/0094378 A1* | 4/2009 | Reus | G06F 15/16 709/235 |
| 2012/0314239 A1* | 12/2012 | Nash | H04N 1/00811 358/1.14 |
| 2016/0124686 A1* | 5/2016 | Maeda | G06F 3/1261 358/1.14 |
| 2016/0286076 A1* | 9/2016 | Kuribara | H04N 1/00344 |
| 2017/0280003 A1* | 9/2017 | Haba | G06F 21/608 |
| 2018/0332182 A1* | 11/2018 | Fukasawa | H04N 1/00344 |

FOREIGN PATENT DOCUMENTS

| | | |
|---|---|---|
| JP | 2007299040 A | 11/2007 |
| JP | 2013076925 A | 4/2013 |
| JP | 2015019256 A | 1/2015 |

* cited by examiner

*Primary Examiner* — Akwasi M Sarpong
*Assistant Examiner* — Pawan Dhingra
(74) *Attorney, Agent, or Firm* — Canon U.S.A., Inc. IP Division

(57) ABSTRACT

A remote operation apparatus including a setting unit configured to set whether or not to restrict connection between an image forming apparatus and another remote operation apparatus other than a remote operation apparatus, and a control unit configured to give an instruction to restrict the connection between the image forming apparatus and the another remote operation apparatus before causing the image forming apparatus to form an image in a case where restriction of the connection between the image forming apparatus and the another remote operation apparatus is set by the setting unit.

14 Claims, 17 Drawing Sheets

FIG 16A
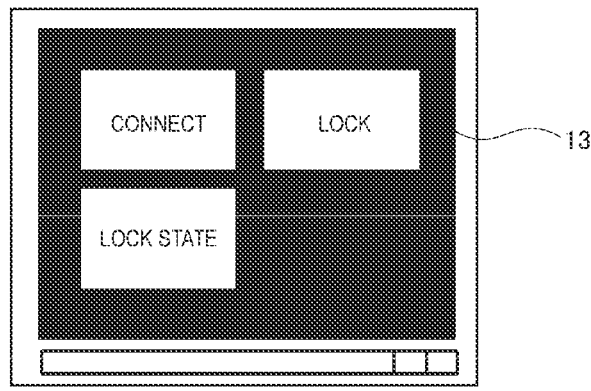
FIG 16B
| MAIN BODY NO. | LOCK TIME | RELEASE BUTTON |
|---|---|---|
| IMAGE FORMING APPARATUS 1-1 | 10 M | RELEASE |
| IMAGE FORMING APPARATUS 1-3 | 3 M | RELEASE |
| IMAGE FORMING APPARATUS 1-4 | 5 M | RELEASE |
| NUMBER OF LOCKABLE APPARATUSES: 1 UNIT | | |
FIG 16C
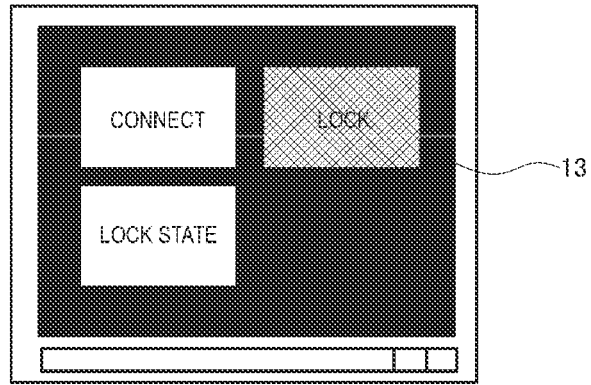

REMOTE OPERATION APPARATUS CAPABLE OF RESTRICTING CONNECTION BETWEEN AN IMAGE FORMING APPARATUS AND ANOTHER REMOTE OPERATION APPARATUS, IMAGE FORMING APPARATUS, AND IMAGE FORMING SYSTEM

BACKGROUND

Field of the Disclosure

The present disclosure relates to a remote operation apparatus that can be remotely operated, an image forming apparatus, and an image forming system.

Description of the Related Art

In recent years, there is a technology called a remote user interface (hereinafter, it is described as a "remote UI") that connects a user terminal, such as a notebook computer or a tablet, to an image forming apparatus and allows a user to operate the image forming apparatus from a distant place using the user terminal. In the remote UI, the operation screen created by the controller of the image forming apparatus is displayed on the screen of the user terminal via the network. In a case where there is a server between the image forming apparatus and the user terminal, an operation screen created by the server is displayed on the user terminal, and an operation input on the operation screen of the user terminal is converted into a command and transmitted to the image forming apparatus, enabling operation of a distant image forming apparatus.

In addition, as the operation portion of the user terminal utilizing the technology of the remote UI, it is conceivable to use a method of connecting to a plurality of image forming apparatuses instead of a dedicated operation portion for connecting to a specific single image forming apparatus. In particular, in a remote UI using a large multifunction peripheral for commercial printing, the print job execution time may be long, and a plurality of different image forming apparatuses may be continuously used. In the case of continuously using such a plurality of different image forming apparatuses, the image forming apparatus is connected to the next image forming apparatus and used after the operation of one image forming apparatus is completed.

In such a situation, Japanese Patent Application Laid-Open No. 2013-076925 (Patent Document 1) discloses an apparatus that sets an operation portion of a device to a locked state in order to prevent an operation by another user when the remote UI is used. In Japanese Patent Application Laid-Open No. 2013-076925, it is possible to prevent access from another user during operation of a device.

However, Patent Document 1 has a problem that, in a case where a user continuously uses a plurality of different image forming apparatuses, there is a possibility that another user first uses an image forming apparatus to be used next.

SUMMARY

It is desirable to provide a remote operation apparatus, an image forming apparatus, and an image forming system that can prevent another user from first using an image forming apparatus that is to be used next by a user in a case where the user wants to continuously use a plurality of different image forming apparatuses.

A remote operation apparatus according to an aspect of the present disclosure is a remote operation apparatus that remotely operates an image forming apparatus, the remote operation apparatus including: a setting unit configured to set whether or not to restrict connection between the image forming apparatus and another remote operation apparatus other than the remote operation apparatus; and a control unit configured to give an instruction to restrict the connection between the image forming apparatus and the another remote operation apparatus before causing the image forming apparatus to form an image in a case where restriction of the connection between the image forming apparatus and the another remote operation apparatus is set by the setting unit.

Further features of various embodiments will become apparent from the following description of exemplary embodiments (with reference to the attached drawings).

BRIEF DESCRIPTION OF THE DRAWINGS

FIGS. 16A, 16B, and 16C are diagrams illustrating an example of a display screen when the number of lockable image forming apparatuses of the remote operation apparatus according to the embodiment of the present disclosure is restricted.

DESCRIPTION OF THE EMBODIMENTS

Hereinafter, embodiments will be described in detail with reference to the drawings.

<Configuration of Image Forming System>

Figure 1:
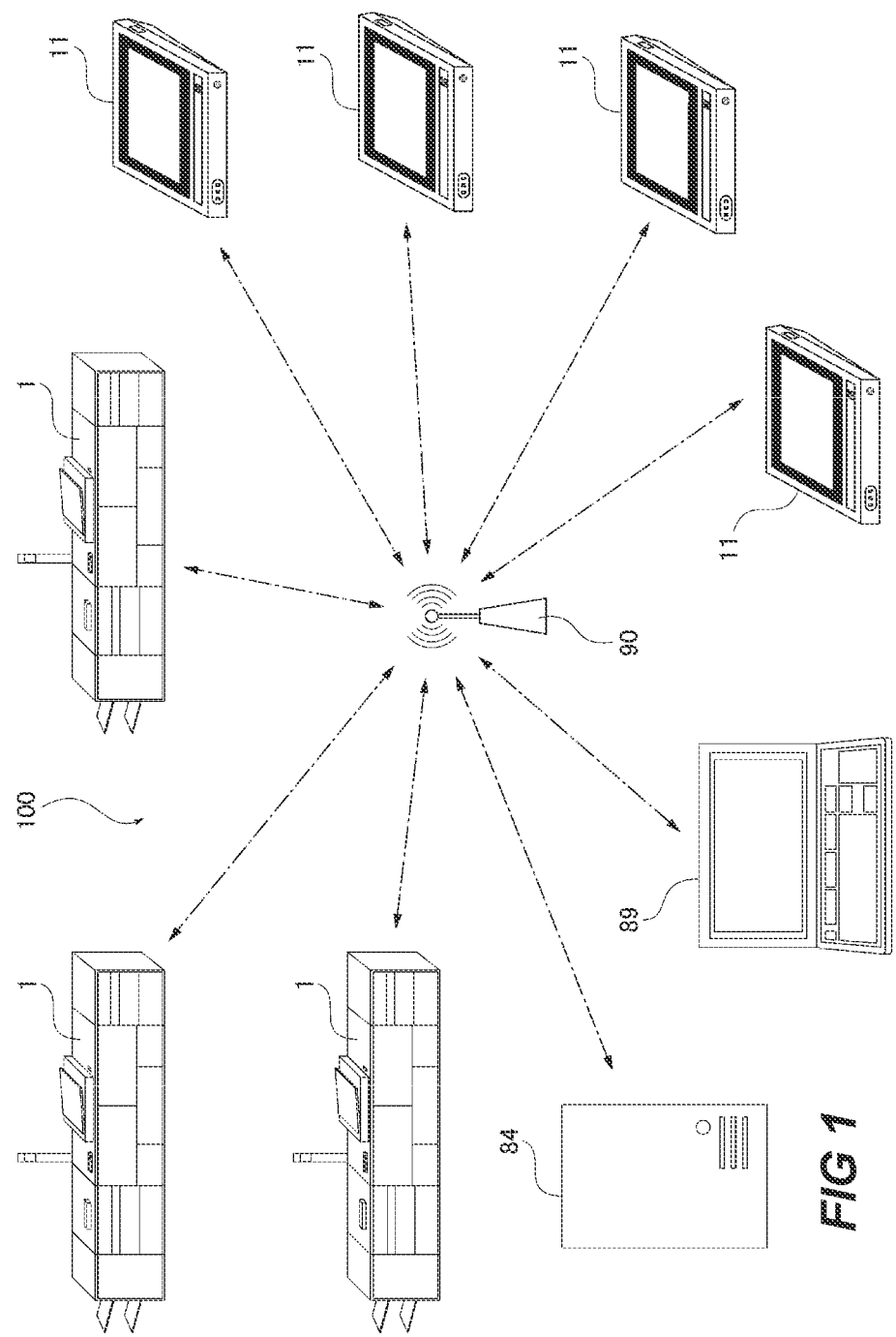
FIG. 1 is a schematic diagram of an image forming system according to an embodiment of the present disclosure.

A configuration of an image forming system 100 according to an embodiment of the present disclosure will be described in detail with reference to FIG. 1.

The image forming system 100 includes an image forming apparatus 1, a remote operation panel 11, a server 84, an administrator PC 89, and an access point 90. The server 84 and the administrator PC 89 are information processing apparatuses.

The image forming apparatus 1 can be wirelessly connected to the remote operation panel 11, the server 84, and the administrator PC 89 via the access point 90.

The remote operation panel 11 is a remote operation apparatus that can be wirelessly connected to the server 84, the administrator PC 89, and the image forming apparatus 1 via the access point 90. The remote operation panel 11 is not connected to the image forming apparatus 1 at the time of startup or at the time of recovery from the power saving mode. When not connected to the image forming apparatus 1, the remote operation panel 11 displays an image of screen data stored in an internal storage device.

The remote operation panel 11 displays operation contents or performs display for selecting an image forming apparatus to be operated, and communicates with the image forming apparatus 1 via the access point 90 according to an operation instruction input by the user. Since the remote operation panel 11 is not connected to the image forming apparatus 1 and the like by a cable, it can be freely carried by the user.

The server 84 can be wirelessly connected to the remote operation panel 11 and the image forming apparatus 1 via the access point 90.

The administrator PC 89 can be wirelessly connected to the remote operation panel 11 and the image forming apparatus 1 via the access point 90. The administrator PC 89 transmits the print job to the image forming apparatus 1 selected by the user through the remote operation panel 11.

The access point 90 can be wirelessly connected to the remote operation panel 11, the image forming apparatus 1, the server 84, and the administrator PC 89.

In the image forming system 100 having the above configuration, as a technique for directly connecting the image forming apparatus 1, the remote operation panel 11, the server 84, and the administrator PC 89, there is one communication form of a wireless LAN called a WiFi direct method. In addition, a technology called Miracast, which is a display transmission technology to which the WiFi direct method is applied, is used in a mobile phone, a display, or a projector.

Note that, although the image forming apparatus 1 and the administrator PC 89 are wirelessly connected to the access point 90, the present disclosure is not limited to this, and the image forming apparatus 1 and the administrator PC 89 may be connected in a wired manner to the access point 90 via a HUB of a LAN connectable to the access point 90.

<Configuration of Image Forming Apparatus>

Figure 2:
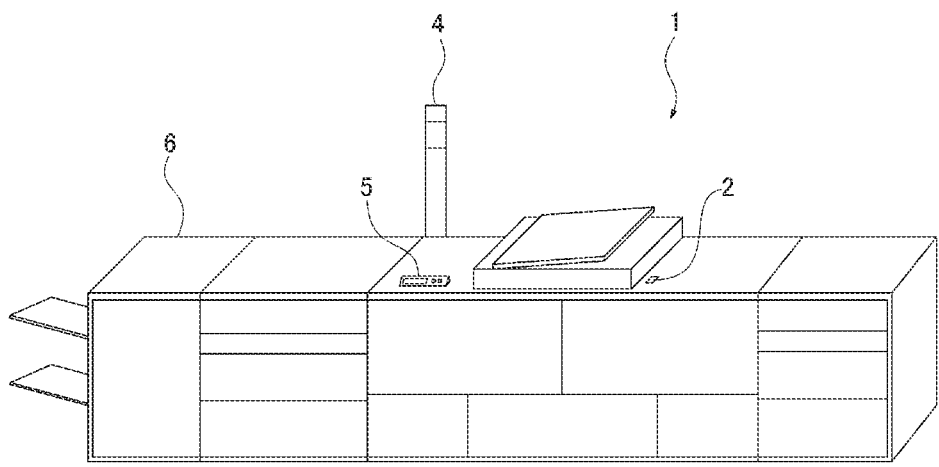
FIG. 2 is a schematic diagram of an image forming apparatus according to the embodiment of the present disclosure.
Figure 3:
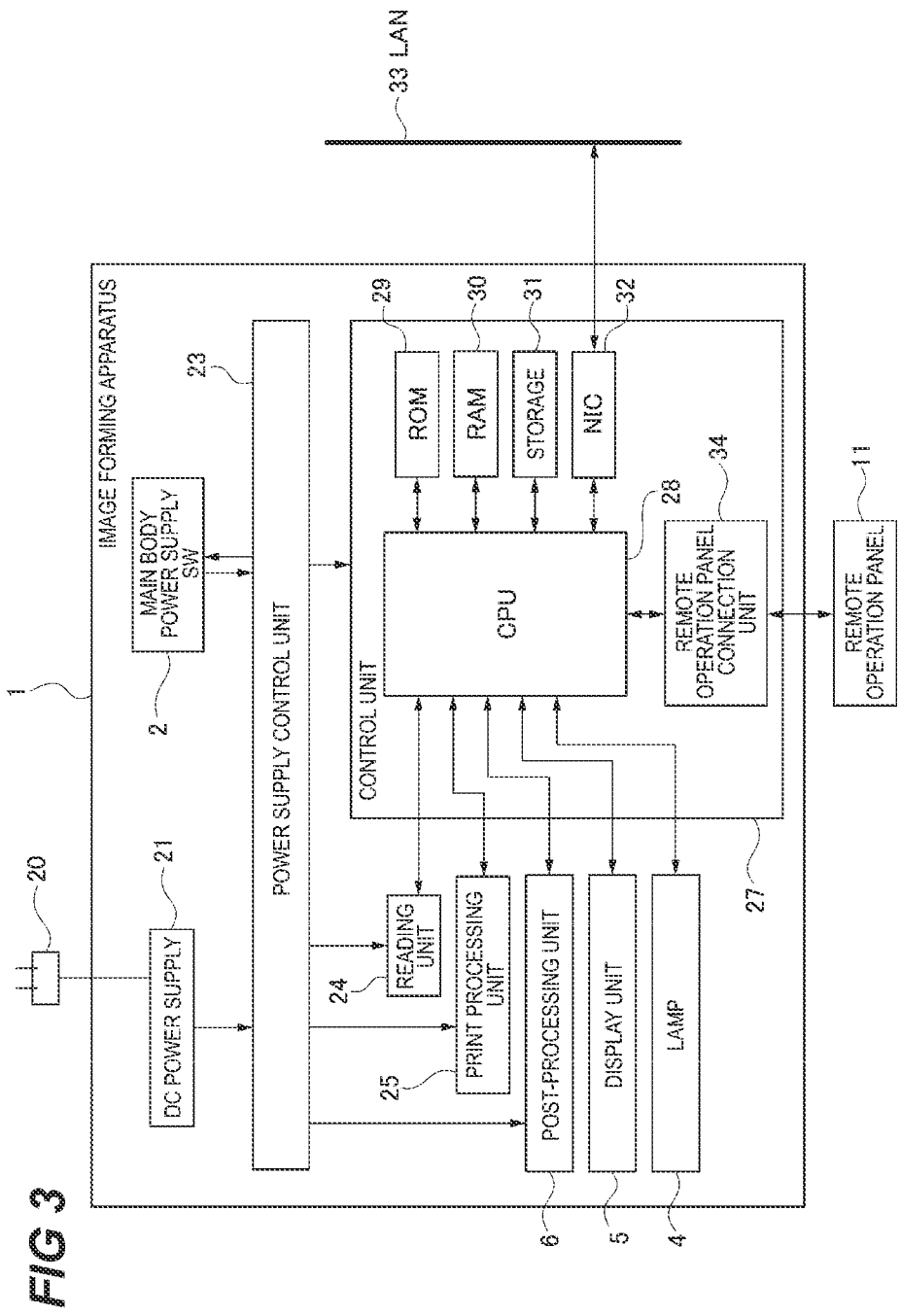
FIG. 3 is a block diagram illustrating a configuration of the image forming apparatus according to the embodiment of the present disclosure.

A configuration of the image forming apparatus 1 according to the embodiment of the present disclosure will be described in detail with reference to FIGS. 2 and 3.

Here, the image forming apparatus 1 is exemplified by a multifunction peripheral having various functions, such as a copy function, a scan function, and a print function. Specifically, the image forming apparatus 1 includes a main body power supply switch 2, a tower-type lamp 4, a display unit 5, a post-processing unit 6, an outlet 20, a DC power supply 21, a power supply control unit 23, a reading unit 24, a print processing unit 25, and a control unit 27.

The main body power supply switch 2 is a switch for turning on or off the power supply of the image forming apparatus 1, and is a seesaw-type or tactile-type switch.

The tower-type lamp 4 has a shape that has good visibility from a distant place and can monitor the state of the image forming apparatus 1 from a distant place. The tower-type lamp 4 issues a notification that printing is being performed or stopped due to an error by the lamp.

The display unit 5 can simply display that printing is being performed or is stopped due to an error. The display simply indicating that printing is stopped due to an error is, for example, an error code.

The post-processing unit 6 optionally performs processing, such as bookbinding or stapler, on the printed matter generated by the print processing unit 25.

The outlet 20 can be connected to a power supply, such as a commercial power supply (not illustrated).

When AC power is supplied from the outlet 20, the DC power supply 21 converts the power of the AC power supply into the power of the DC power supply, and supplies the converted power of the DC power supply to the power supply control unit 23.

The power supply control unit 23 performs power control of the image forming apparatus 1. Power of the DC power supply is supplied from the DC power supply 21 to the power supply control unit 23. When the main body power supply switch 2 is turned on, the power supply control unit 23 supplies power supplied from the DC power supply 21 to the control unit 27, and supplies power to the tower-type lamp 4, the display unit 5, the post-processing unit 6, the reading unit 24, and the print processing unit 25 according to an instruction from a CPU 28 of the control unit 27.

The power supply control unit 23 issues a notification to the CPU 28 of the control unit 27 when the main body power supply switch 2 is turned off, and stops power supply to the tower-type lamp 4, the display unit 5, the post-processing unit 6, the reading unit 24, and the print processing unit 25 according to an instruction from the CPU 28. Even in a case where the main body power supply switch 2 is not turned off, the power supply control unit 23 can stop power supply to the tower-type lamp 4, the display unit 5, the post-processing unit 6, the reading unit 24, and the print processing unit 25 and turn off the main body power supply switch 2 according to an instruction from the CPU 28.

Here, the case of turning off the main body power supply switch 2 according to an instruction from the CPU 28 is, for example, when an abnormality occurs, when an instruction to turn off the power is received from the user via a network control IC (hereinafter, it is described as "NIC") 32, and the like.

The reading unit 24 reads an original and generates image data of the read original. The reading unit 24 outputs the generated image data to the CPU 28 of the control unit 27.

The print processing unit 25 executes print processing under the control of the CPU 28 to generate a printed matter. The print processing unit 25 conveys the generated printed matter to the post-processing unit 6.

The control unit 27 as a second control unit controls the entire operation of the image forming apparatus 1. The control unit 27 includes the CPU 28, a ROM 29, a RAM 30, a storage 31, the NIC 32, and a remote operation panel connection unit 34.

The CPU 28 reads and executes the startup program stored in the ROM 29 according to a user instruction input from the NIC 32, controlling the operation of the image forming apparatus 1 while using the RAM 30. According to a print instruction input from the NIC 32, the CPU 28 performs control to cause the print processing unit 25 to execute print processing based on print data input from the NIC 32 or image data input from the reading unit 24.

The CPU 28 reads image data of an image displayed on the remote operation panel 11 from the storage 31, and performs control to transmit the read image data to the remote operation panel 11 via the remote operation panel connection unit 34. The CPU 28 performs command communication for transmitting and receiving operation contents to and from the remote operation panel 11 via the remote operation panel connection unit 34.

The CPU 28 performs power control, such as turning on or off the power supply of the image forming apparatus 1 or a power saving mode. Here, the power saving mode is a mode for stopping unnecessary power supply to the reading unit 24, the print processing unit 25, or the post-processing unit 6, for example, in a case where the reading unit 24, the print processing unit 25, or the post-processing unit 6 is not used. Note that a detailed description of the power saving mode will be omitted.

The ROM 29 stores a startup program of the image forming apparatus 1, information regarding various settings, and the like.

The RAM 30 is used for temporary data storage.

The storage 31 is, for example, a hard disc drive (HDD) or a solid state drive (SSD), and is used for storing various data. The data stored in the storage 31 is, for example, image data or printing data of an image displayed on the remote operation panel 11.

The NIC 32 as a receiving unit is connected to a LAN 33, and receives a print instruction or print data for the image forming apparatus 1 via the LAN 33. The NIC 32 outputs the received print instruction or print data for the image forming apparatus 1 to the CPU 28. The NIC 32 receives a user instruction, such as setting change or power off of the image forming apparatus 1, via the LAN 33 from a PC, a tablet, and the like distant from the image forming apparatus 1. The NIC 32 outputs the received user instruction to the CPU 28. The connection between the NIC 32 and the LAN 33 may be a wired connection or a wireless connection.

In the control unit 27 having the above configuration, the NIC 32 and the remote operation panel connection unit 34 may be shared. However, in this case, the image forming apparatus 1 and the remote operation panel 11 cannot be connected by the WiFi direct method. In addition, the image forming apparatus 1 and the remote operation panel 11 are connected via a normal network, and communicate print data, command communication, and image data of a screen displayed on the remote operation panel 11 through the same path.

The remote operation panel connection unit 34 performs wireless communication with the remote operation panel 11 under the control of the CPU 28. Under the control of the CPU 28, the remote operation panel connection unit 34 transmits image data of an image displayed on the remote operation panel 11 to the remote operation panel 11, and performs command communication with the remote operation panel 11. Note that the connection unit for command communication and the connection unit for communication of image data of an image on the display screen are not limited to the case where the remote operation panel connection unit 34 also serves as the connection unit, and may be divided into two connection units.

By providing the NIC 32 and the remote operation panel connection unit 34, the image forming apparatus 1 can make a response of screen display faster than in a case where the NIC 32 and the remote operation panel connection unit 34 are shared, and can shorten a time required for receiving print data.

<Configuration of Remote Operation Panel>

Figure 4:
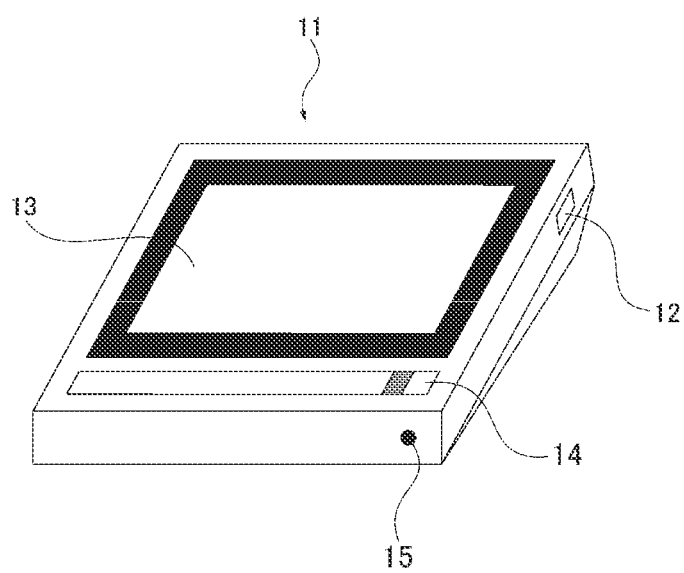
FIG. 4 is a schematic diagram of a remote operation apparatus according to the embodiment of the present disclosure.
Figure 5:
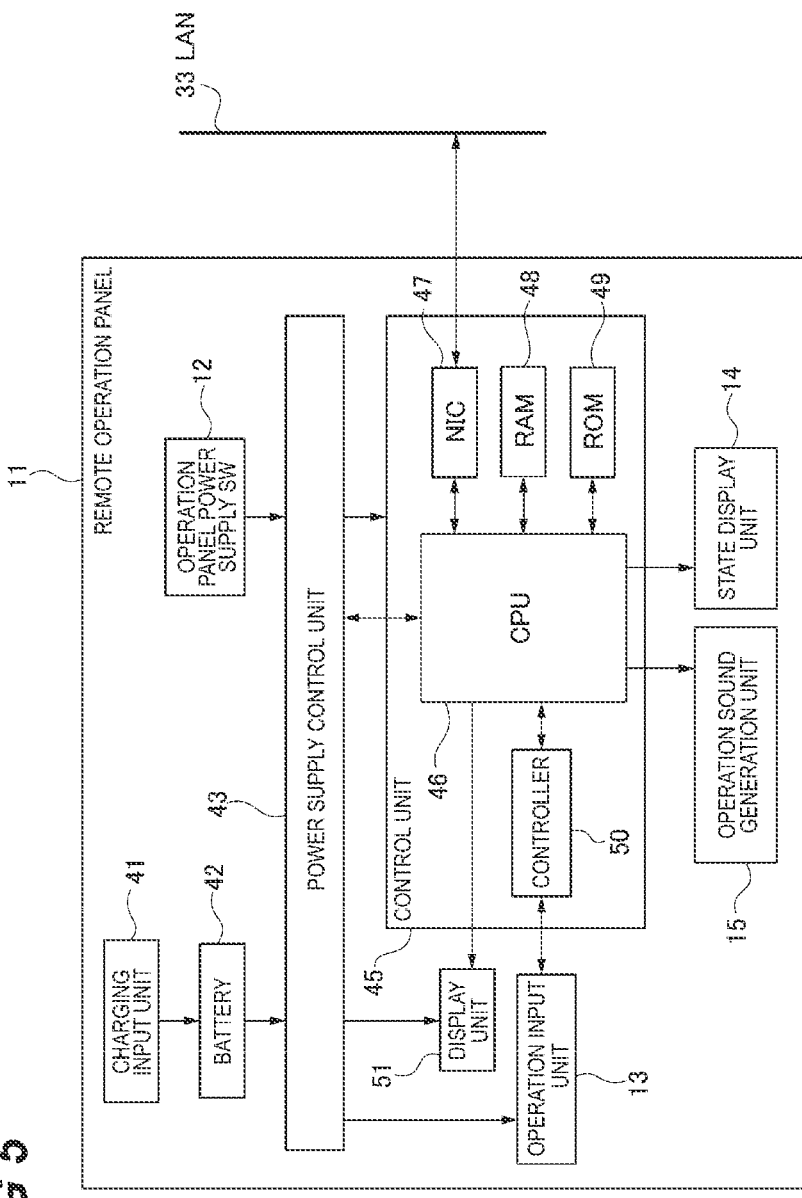
FIG. 5 is a block diagram illustrating a configuration of the remote operation apparatus according to the embodiment of the present disclosure.

A configuration of the remote operation panel 11 according to the embodiment of the present disclosure will be described in detail with reference to FIGS. 4 and 5.

The remote operation panel 11 includes an operation panel power supply switch 12, an operation input unit 13, a state display unit 14, an operation sound generation unit 15, a charging input unit 41, a battery 42, a power supply control unit 43, a control unit 45, and a display unit 51.

The operation panel power supply switch 12 turns on or off the power supply of the remote operation panel 11.

The operation input unit 13 as a setting unit is connected to a CPU 46 of the control unit 45 via an interface (not illustrated), and is a touch panel and the like to which an operation instruction is input by the user. The operation input unit 13 outputs an electrical signal corresponding to the input coordinates of the user to a controller 50.

The state display unit 14 is connected to the CPU 46 of the control unit 45 via an interface (not illustrated), and notifies the user of the state of the image forming apparatus 1 or the remote operation panel 11 by an LED and the like.

The operation sound generation unit 15 is connected to the CPU 46 of the control unit 45 via an interface (not illustrated), and is a speaker and the like that generates a sound according to a user's operation on the operation input unit 13.

The charging input unit 41 is connected to an external charger (not illustrated).

The battery 42 accumulates power supplied from the charger via the charging input unit 41.

The power supply control unit 43 performs power supply control to supply the power accumulated in the battery 42 to each unit of the remote operation panel 11 under the control of the CPU 46 of the control unit 45.

The control unit 45 as a first control unit controls the entire operation of the remote operation panel 11. The control unit 45 includes the CPU 46, an NIC 47, a RAM 48, a ROM 49, and the controller 50.

The CPU 46 controls the operation of the remote operation panel 11 while using the RAM 48 based on the startup program and various types of setting information stored in the ROM 49.

The CPU 46 performs control to stop image output and power supply to the display unit 51. Specifically, the CPU 46 performs the above control in a case where there is no input to the remote operation panel 11 for a certain period of time, in a case where an instruction to shift to the power saving mode is given from the user, or in a case where it is determined that the instruction to shift to the power saving mode is given when the operation panel power supply switch 12 is pressed. In a case where a user input is detected based on an electrical signal input from the controller 50, the CPU 46 controls the power supply control unit 43 to return from the power saving mode to the normal power mode.

When shifting to the normal power mode, the CPU 46 performs control to display an image of the image data stored in the ROM 49 on the display unit 51.

The NIC 47 as a receiving unit performs control such as a case of being connected to the image forming apparatus 1 or a case of being connected to the access point 90 via the LAN 33.

The RAM 48 temporarily stores data and the like as the CPU 46 executes a program. Here, the above data is image data and the like of an image displayed on the display unit 51 received from the image forming apparatus 1.

The ROM 49 stores in advance a startup program of the image forming apparatus 1, various types of setting information, image data of an image displayed on the operation input unit 13 in a case where the image forming apparatus 1 is not connected, and the like. Here, the image data is, for example, a selection screen for selecting connection to the image forming apparatus 1 and locking of the image forming apparatus 1, or data output for displaying a list of connectable image forming apparatuses 1 on the display unit 51.

The controller 50 determines the input coordinates of the user in the operation input unit 13 based on the electrical signal input from the operation input unit 13, and outputs the electrical signal corresponding to the determination result to the CPU 46.

The display unit 51 is, for example, an LCD, and is connected to the CPU 46 of the control unit 45 via an interface (not illustrated). The display unit 51 switches and displays the image of the image data stored in the ROM 49 or the image of the image data received via the NIC 47 under the control of the CPU 46. Note that the image displayed on the display unit 51 is not limited to the case of being switched by the CPU 46, and may be switched by a selector for switching an output image provided outside.

<Operation of Remote Operation Apparatus>

An operation of the remote operation panel 11 according to the embodiment of the present disclosure will be described in detail with reference to FIGS. 6 to 7E.

Figure 7A:
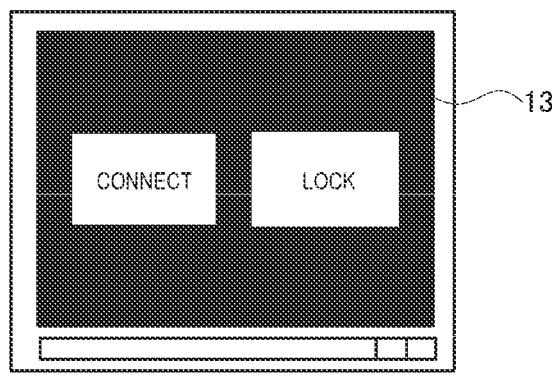
FIGS. 7A, 7B, 7C, 7D, and 7E are diagrams illustrating an example of a display screen of the remote operation apparatus according to the embodiment of the present disclosure.
Figure 7B:
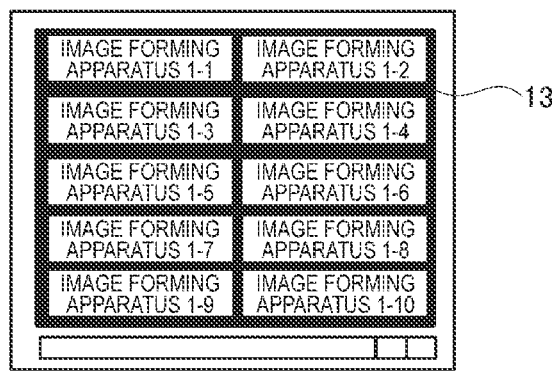
Figure 7C:
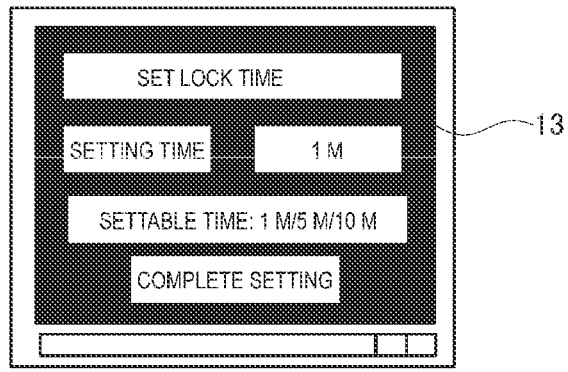
Figure 7D:
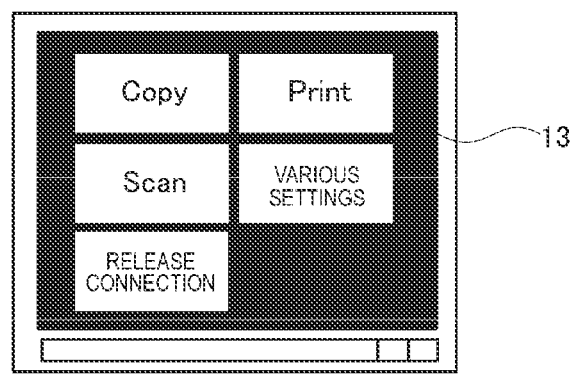
Figure 7E:
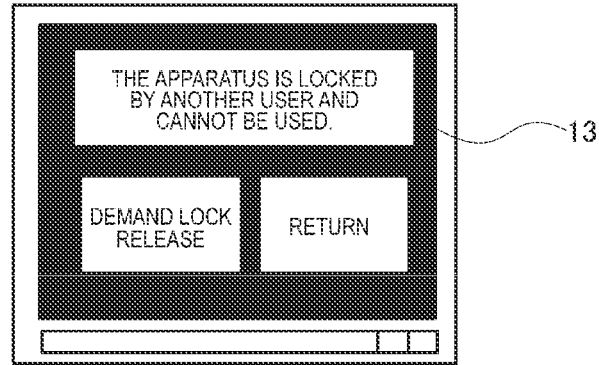

In FIGS. 7A to 7E, FIG. 7A is a screen for waiting for reception of an instruction from the user, and FIG. 7B is a screen for waiting for selection of the image forming apparatus 1 to be locked. In addition, FIG. 7C is a screen for setting a lock time, FIG. 7D is a screen when the connection processing is finished, and FIG. 7E is a screen when connection impossible is received.

Figure 6:
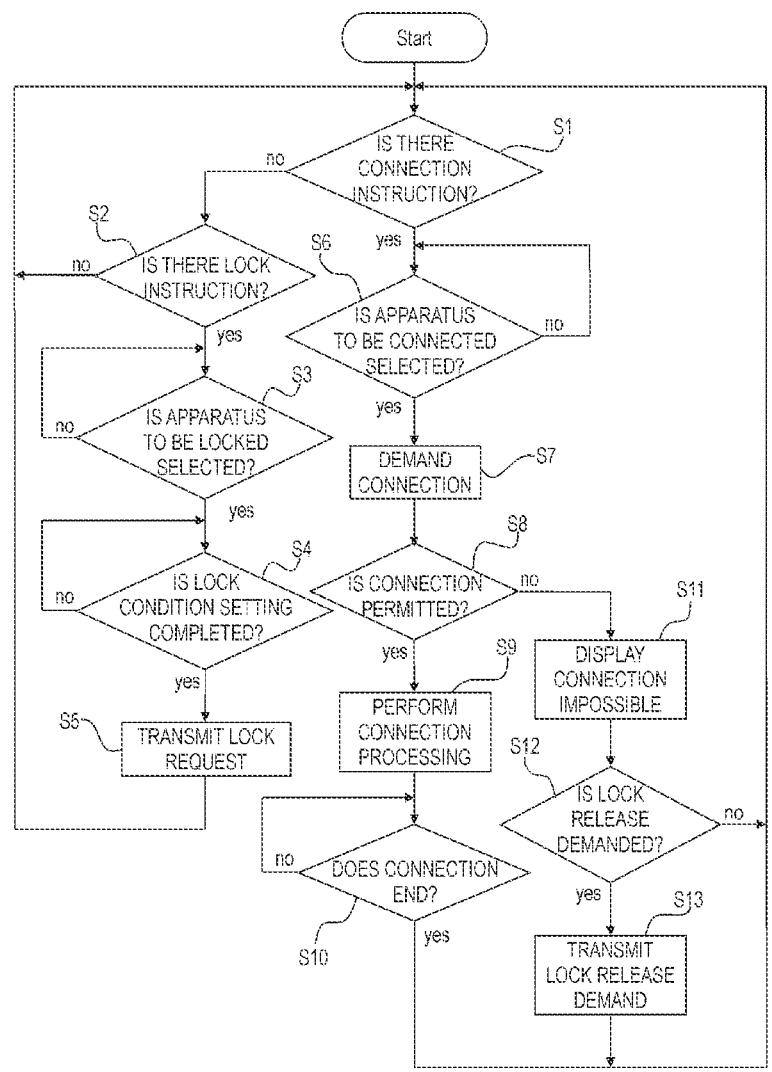
FIG. 6 is a flowchart illustrating an operation of the remote operation apparatus according to the embodiment of the present disclosure.

The operation illustrated in FIG. 6 is started when the operation panel power supply switch 12 of the remote operation panel 11 is turned on.

First, the CPU 46 controls the controller 50 to display a screen, for example as illustrated in FIG. 7A, on the operation input unit 13 based on the image data stored in the ROM 49. Then, the CPU 46 determines whether or not an instruction for connection to the image forming apparatus 1 has been input from the operation input unit 13 via the controller 50 (S1).

Next, in a case where an instruction for connection to the image forming apparatus 1 has not been input (step S1: no), the CPU 46 determines whether or not a lock instruction has been input from the operation input unit 13 via the controller 50 (S2). Here, the lock means that connection between the image forming apparatus 1 and another remote operation panel 11 other than the specific remote operation panel 11 is restricted by the specific remote operation panel 11 before image formation in which the specific remote operation panel 11 causes the image forming apparatus 1 to form an image.

In a case where the lock instruction is not input (step S2: no), the CPU 46 returns to the operation of step S1.

On the other hand, in a case where a lock instruction is input from the controller 50 (step S2: yes), the CPU 46 controls the controller 50 to display a screen, for example as illustrated in FIG. 7B, on the operation input unit 13 based on the image data stored in the ROM 49. Specifically, in a case where "Lock" is selected on the screen illustrated in FIG. 7A displayed on the operation input unit 13, the CPU 46 determines that a lock instruction is input when an electrical signal indicating that "Lock" is selected is input from the controller 50. Then, the CPU 46 determines whether or not the image forming apparatus 1 to be locked has been selected (S3).

In a case where the image forming apparatus 1 to be locked is not selected (step S3: no), the CPU 46 repeats the processing of step S3 and waits until the image forming apparatus 1 to be locked is selected.

On the other hand, in a case where the image forming apparatus 1 to be locked is selected (step S3: yes), the CPU 46 controls the controller 50 to display a screen, for example as illustrated in FIG. 7C, on the operation input unit 13 based on the image data stored in the ROM 49. Specifically, the CPU 46 determines that the image forming apparatus 1 to be locked has been selected when information of image forming apparatuses 1-1 to 1-10 selected on the screen illustrated in FIG. 7B displayed on the operation input unit 13 is input from the controller 50. Then, the CPU 46 determines whether or not setting of the lock condition is completed (S4). Here, the lock condition is a time for locking (hereinafter, described as "lock time"), the number of image forming apparatuses 1 to be locked, and the like.

In a case where the setting of the lock condition has not been completed (step S4: no), the CPU 46 repeats the processing of step S4 and waits for the setting of the lock condition.

On the other hand, in a case where the setting of the lock condition is completed (step S4: yes), the CPU 46 transmits a lock instruction to the selected image forming apparatus 1 to be locked via the NIC 47 and the LAN 33 (S5), and then returns to the operation of step S1.

Here, the lock instruction refers to an instruction for the specific remote operation panel 11 to restrict the image forming apparatus 1 from being connected to any other than the another remote operation panel 11. Specifically, in a case where "Complete setting" is selected on the screen illustrated in FIG. 7C displayed on the operation input unit 13, the CPU 46 determines that the setting of the lock condition has been completed when an electrical signal indicating the completion of the setting of the lock condition is input from the controller 50. For example, the CPU 46 transmits a lock instruction including information of its own apparatus, such as an IP address.

Note that, in the operation of step S3, the CPU 46 is not limited to the case of selecting the image forming apparatus 1 to be locked, and may select the user to be locked. In this case, the CPU 46 transmits a lock instruction including user information of the user who uses the remote operation panel 11.

The processing from step S2 to step S5 described above is processing for restricting connection of the image forming apparatus 1 to be used next by another remote operation panel 11 in advance in a case where the remote operation panel 11 is continuously connected to the plurality of image forming apparatuses 1 and used.

In addition, in a case where an instruction for connection to the image forming apparatus 1 is input in the operation of step S1 (step S1: yes), the CPU 46 controls the controller 50 to display a screen as illustrated in FIG. 7B based on the image data stored in the ROM 49. Then, the CPU 46 determines whether or not the image forming apparatus 1 to be connected has been selected (S6).

In a case where the image forming apparatus 1 to be connected is not selected (step S6: no), the CPU 46 repeats the processing of step S6 and waits until the image forming apparatus 1 is selected.

On the other hand, in a case where the image forming apparatus 1 to be connected is selected (step S6: yes), the CPU 46 transmits a connection demand to the selected image forming apparatus 1 to be connected via the NIC 47 and the LAN 33 (S7). Specifically, the CPU 46 determines that the image forming apparatus 1 to be connected has been selected when information of the image forming apparatuses 1-1 to 1-10 selected on the screen illustrated in FIG. 7B displayed on the operation input unit 13 is input from the controller 50.

Next, the CPU 46 determines whether or not a response signal input from the image forming apparatus 1 that has transmitted the connection demand via the LAN 33 and the NIC 47 is connection permission (S8).

Specifically, the CPU 46 determines whether or not the connection is permitted by using the serial number or the user information of the remote operation panel 11. For example, a response signal in which information indicating whether or not connection is permitted and a serial number or user information are associated with each other is input to the CPU 46. Then, the CPU 46 determines whether or not the serial number or the user information associated with the connection permission in the input response signal is the serial number or the user information of the own apparatus.

In a case where the input response signal is connection permission (S8: yes), the CPU 46 performs connection processing (S9). For example, in a case where the serial number or the user information associated with the connection permission in the input response signal is the serial number or the user information of the own apparatus, the CPU 46 determines that the input response signal is the connection permission.

Next, the CPU 46 controls the controller 50 to display a screen as illustrated in FIG. 7D on the operation input unit 13 based on the image data stored in the ROM 49. Then, the CPU 46 determines whether or not the connection processing has ended (S10).

In a case where the connection processing has not ended (S10: no), the CPU 46 repeats the operation of step S10 and waits for the end of the connection processing.

On the other hand, in a case where the connection processing ends (S10: yes), the CPU 46 returns to the operation of step S1. Specifically, the CPU 46 determines that the connection processing has ended in a case where there is no operation for a certain period of time after "Release connection" is selected on the screen illustrated in FIG. 7D displayed on the operation input unit 13 based on the electrical signal input from the controller 50.

In addition, in a case where the input response signal is unconnectable in the operation of step S8 (S8: no), the CPU 46 performs the connection impossible display (S11). Specifically, the CPU 46 controls the controller 50 to display a screen, for example as illustrated in FIG. 7E, on the operation input unit 13 based on the image data stored in the ROM 49.

Next, the CPU 46 determines whether or not to make a lock release demand (S12).

In a case where a lock release demand is not made (S12: no), the CPU 46 returns to the operation of step S1.

On the other hand, in a case where a lock release demand is made (S12: yes), the CPU 46 transmits the lock release demand to the image forming apparatus 1 demanding the lock release via the MC 47 and the LAN 33 (S13). Specifically, in a case where "Demand lock release" is selected on the screen illustrated in FIG. 7E displayed on the operation input unit 13, the CPU 46 determines to demand lock release when an electrical signal indicating that lock release is demanded is input from the controller 50. The lock release demand is transmitted to another remote operation panel 11 that has issued the lock instruction via the image forming apparatus 1 that demands the lock release. Then, the CPU 46 then returns to the operation of step S1.

<Operation of Image Forming Apparatus>

An operation of the image forming apparatus 1 according to the embodiment of the present disclosure will be described in detail with reference to FIG. 8.

Figure 8:
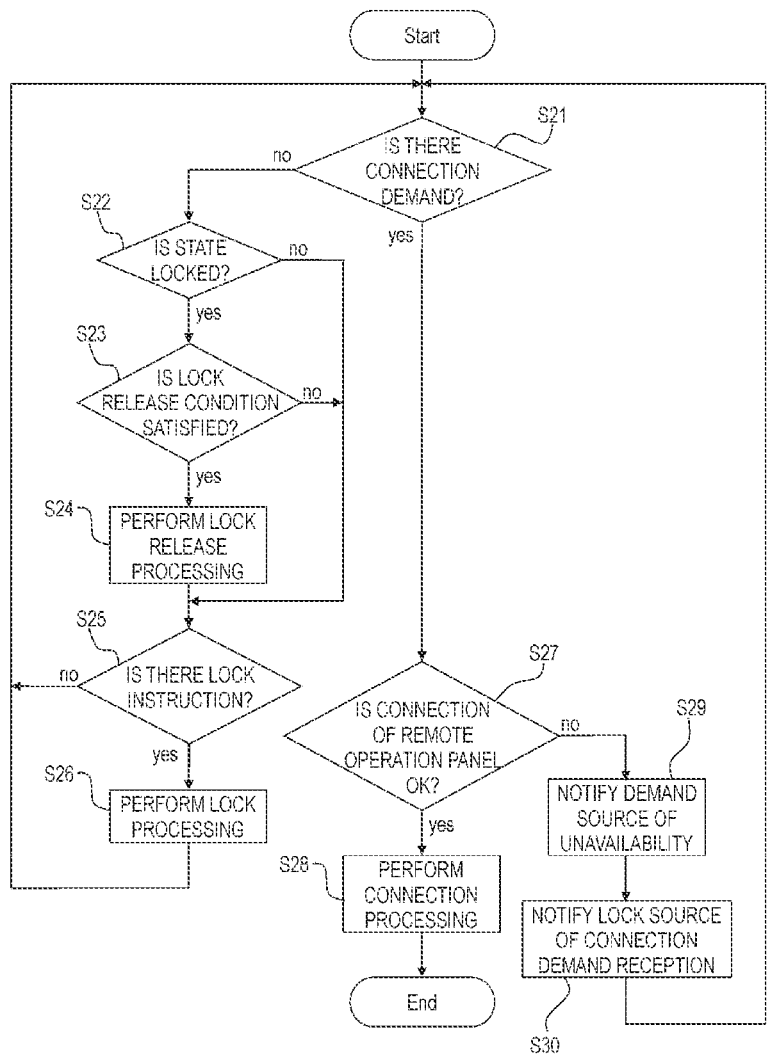
FIG. 8 is a flowchart illustrating an operation of the image forming apparatus according to the embodiment of the present disclosure.

The operation illustrated in FIG. 8 is started when the main body power supply switch 2 of the image forming apparatus 1 is turned on.

First, the CPU 28 determines whether or not there is a connection demand from the remote operation panel 11 (S21).

In a case where there is no connection demand (step S21: no), the CPU 28 determines whether or not the image forming apparatus 1 is in a locked state (S22). Here, the locked state is a state in which connection to another remote operation panel 11 is restricted by an instruction from the remote operation panel 11 and connection to another remote operation panel 11 cannot be established.

In a case where the locked state is established (step S22: yes), the CPU 28 determines whether or not the lock release condition is satisfied (S23). Here, the lock release condition is that the image forming apparatus 1 has received a lock release demand from the remote operation panel 11 or the administrator PC 89 to which the lock instruction has been transmitted, or that a set lock time has elapsed.

In a case where the lock release condition is satisfied (step S23: yes), the CPU 28 performs lock release processing (S24). At this time, the CPU 28 may notify (transmit release notification) the remote operation panel 11 that the lock is to be released. Here, the release notification for issuing a notification that the lock is released is a notification that connection is possible.

Next, the CPU 28 determines whether or not a lock instruction has been received from the remote operation panel 11 via the LAN 33 and the NIC 32 (S25).

In a case where the lock instruction has not been received (S25: no), the CPU 28 returns to the operation of step S21.

On the other hand, in the operation of step S22, in a case where it is not in the locked state (step S22: no), the CPU 28 skips to the operation of step S25.

In addition, in a case where the lock release condition is not satisfied in the operation of step S23 (step S23: no), the CPU 28 skips to the operation of step S25.

In addition, in the operation of step S25, in a case where a lock instruction has been received (step S25: yes), the CPU 28 performs lock processing (S26), and then returns to the processing of step S21. Here, the lock processing is processing of setting a condition for determining whether or not the remote operation panel 11 is connectable when receiving a connection demand from the remote operation panel 11 in the image forming apparatus 1. For example, in the lock processing, the CPU 28 performs setting such that whether or not the remote operation panel 11 is connectable can be determined using the IP address, serial number, and the like of the UI.

In addition, in a case where there is a connection demand in the operation of step S21 (S21: yes), the CPU 28 determines whether or not the connection to the remote operation panel 11 of the connection demand source that has transmitted the connection demand is OK (S27). Specifically, in the locked state, the CPU 28 demands the remote operation panel 11 that has transmitted the connection demand for information for determining whether or not the remote operation panel 11 may be connected. Then, the CPU 28 determines whether or not the connection to the remote operation panel 11 that has transmitted the connection demand is OK based on the transmitted information. The above information is an IP address, a serial number, and the like of the UI.

In a case where the remote operation panel 11 is connectable (step S27: yes), the CPU 28 performs connection processing with the connectable remote operation panel 11, starts transmission of image data of an image displayed on the remote operation panel 11 (S28), and then ends the operation.

On the other hand, in a case where the remote operation panel 11 is unconnectable (step S27: no), the CPU 28 notifies the remote operation panel 11 that is the connection demand source of unavailability (S29).

Next, the CPU 28 notifies the lock source of the remote operation panel 11 that has issued the lock instruction that the connection demand has been received (S30), and then returns to the operation of step S21.

<Interrupt Processing>

An interrupt processing of the remote operation panel 11 according to the embodiment of the present disclosure will be described in detail with reference to FIGS. 9 to 10B.

Figure 10A:
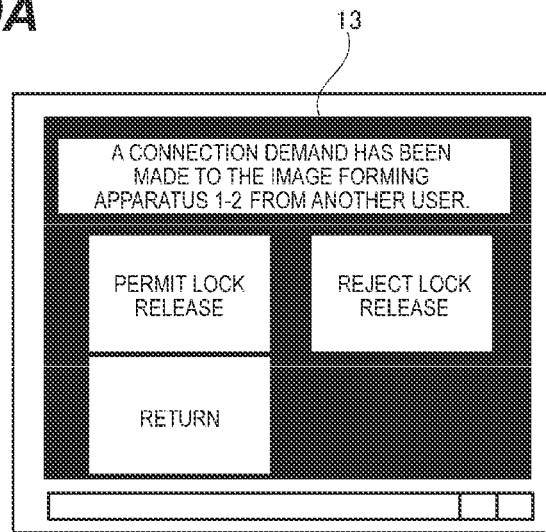
FIGS. 10A and 10B are diagrams illustrating an example of a display screen when a lock release request of the remote operation apparatus according to the embodiment of the present disclosure is received.
Figure 10B:
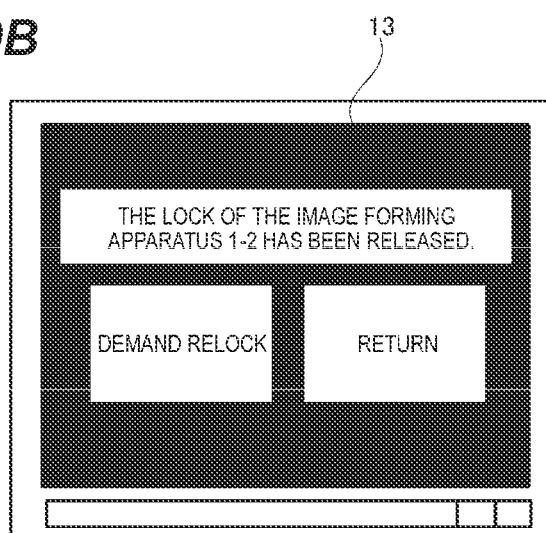

In FIGS. 10A and 10B, FIG. 10A is a screen indicating that a connection demand has been made, and FIG. 10B is a screen indicating that the lock has been released.

Here, the interrupt processing is executed in a case where the image forming apparatus 1 issues a notification (demand notification) that the remote operation panel 11 that has issued the lock instruction has received a connection demand from another remote operation panel 11. Alternatively, the processing is performed in a case where the image forming apparatus 1 issues a notification that the lock has been released after the lock time set by the remote operation panel 11 that has issued the lock instruction has elapsed.

Figure 9:
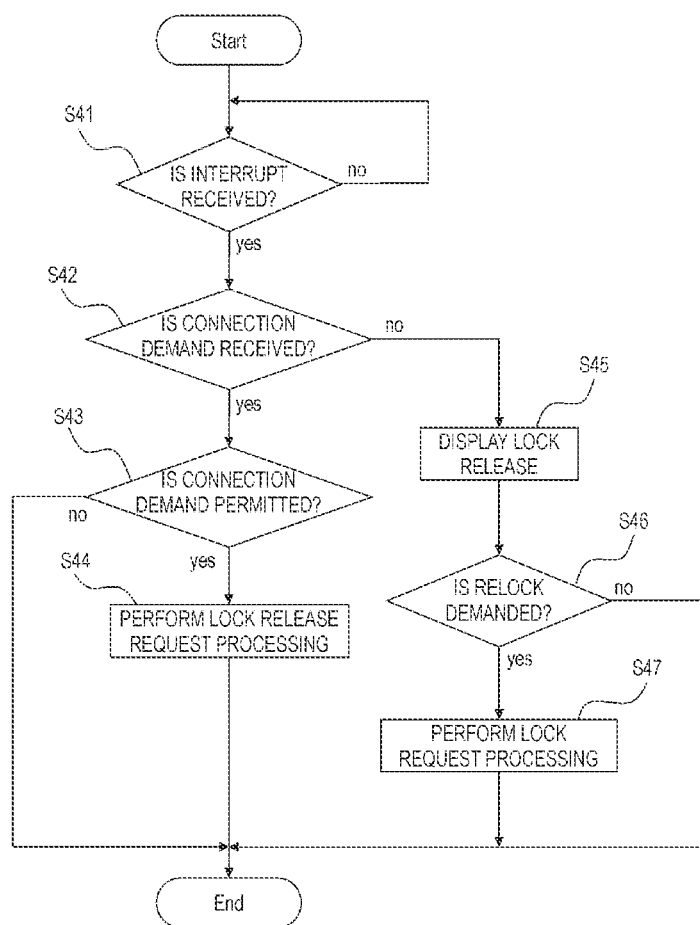
FIG. 9 is a flowchart illustrating an interrupt operation of the remote operation apparatus according to the embodiment of the present disclosure.

The interrupt processing illustrated in FIG. 9 is started when the operation panel power supply switch 12 of the remote operation panel 11 is turned on.

First, the CPU 46 determines whether or not there is interrupt reception (S41). Specifically, the CPU 46 determines whether or not a notification of a connection demand from another remote operation panel 11 has been received from the image forming apparatus 1, or whether or not a notification of lock releasing after a set lock time has elapsed has been received from the image forming apparatus 1.

In a case where there is no interrupt reception (step S41: no), the CPU 46 repeats the processing of step S41 and waits until there is interrupt reception.

On the other hand, in a case where there is interrupt reception (step S41: yes), the CPU 46 determines whether or not a connection demand has been received from another remote operation panel 11 other than the remote operation panel 11 that has issued the lock instruction (S42).

When receiving a connection demand from another remote operation panel 11 (S42: yes), the CPU 46 controls the controller 50 to display a screen, for example as illustrated in FIG. 10A, on the operation input unit 13 based on the image data stored in the ROM 49. For example, the screen of FIG. 10A includes buttons of "Permit lock release", "Reject lock release", and "Return". In addition, the operation input unit 13 performs display that allows the user to select whether to release the lock and whether to return and continue the work. Then, the CPU 46 determines whether or not to permit the connection demand from another remote operation panel 11 (S43).

The above display is performed by switching image data stored in the ROM 49. However, the above display is not limited to this, and the image data received from the image forming apparatus 1 may be processed, and the interrupt image may be combined with the image of the received image data and displayed. In addition, the above display may be displayed by receiving the input coordinates, performing control such as whether or not to permit the interrupt demand, and inserting the interrupt information into the image data received from the image forming apparatus 1. In a case where the above display is performed by switching the image data stored in the ROM 49, it is possible to easily perform display as compared with a case where an interrupt image is combined with an image of the image data and displayed and a case where interrupt information is inserted into the image data and displayed.

When permitting a connection demand from another remote operation panel 11 (step S43: yes), the CPU 46 performs lock release request processing (S44), and then ends the interrupt processing. Here, the lock release request processing is processing of transmitting a restriction release request to the image forming apparatus 1 that has issued a lock instruction. Specifically, in a case where "Permit lock release" is selected on the screen illustrated in FIG. 10A, the CPU 46 determines to permit the connection demand when an electrical signal indicating that the lock release is permitted is input from the controller 50.

On the other hand, when not permitting the connection demand from the another remote operation panel 11 (step S43: no), the CPU 46 ends the interrupt processing.

In addition, in a case where the connection demand has not been received in the processing of step S42 (step S42: no), the CPU 46 determines that the lock release notification has been received from the image forming apparatus 1. Then, the CPU 46 controls the controller 50 to display the lock release on the operation input unit 13 based on the image data stored in the ROM 49 (S45). The CPU 46 causes the operation input unit 13 to display lock release as illustrated in FIG. 10B, for example. Note that, in the screen illustrated in FIG. 10B, the lock release factor is not displayed, but timeout, lock releasing by the administrator, and the like may be added to the display according to the unlocking factor.

Next, the CPU 46 determines whether or not there is a relock demand again (S46).

In a case where there is a relock demand (step S46: yes), the CPU 46 transmits a relock request to the released image forming apparatus 1 via the NIC 47 and the LAN 33 (S47). Specifically, in a case where "Demand relock" is selected on the screen illustrated in FIG. 10B, the CPU 46 determines that there is a relock demand when an electrical signal indicating the relock demand is input from the controller 50. At this time, the CPU 46 may control the controller 50 to display a screen, for example as illustrated in FIG. 7C, on the operation input unit 13 based on the image data stored in the ROM 49. Then, the CPU 46 then ends the interrupt processing.

On the other hand, in a case where there is no relock demand (step 46: no), the CPU 46 ends the interrupt processing.

Note that, in the above interrupt processing, the interrupt factor is limited to the reception and lock release of the connection demand, but some embodiments are not limited to this, and in a case where there is an interrupt factor other than the reception and the lock release of the connection demand, the determination processing may be increased for each interrupt factor.

<Communication Processing>

Communication processing in the image forming apparatus 1 and the remote operation panel 11 according to the embodiment of the present disclosure will be described in detail with reference to FIGS. 11 to 16C.

First, communication processing at the time of connection between the image forming apparatus 1 and the remote operation panel 11 will be described in detail with reference to FIG. 11. The communication processing illustrated in FIG. 11 illustrates a case where the image forming apparatus 1 and the remote operation panel 11 can be connected.

Figure 11:
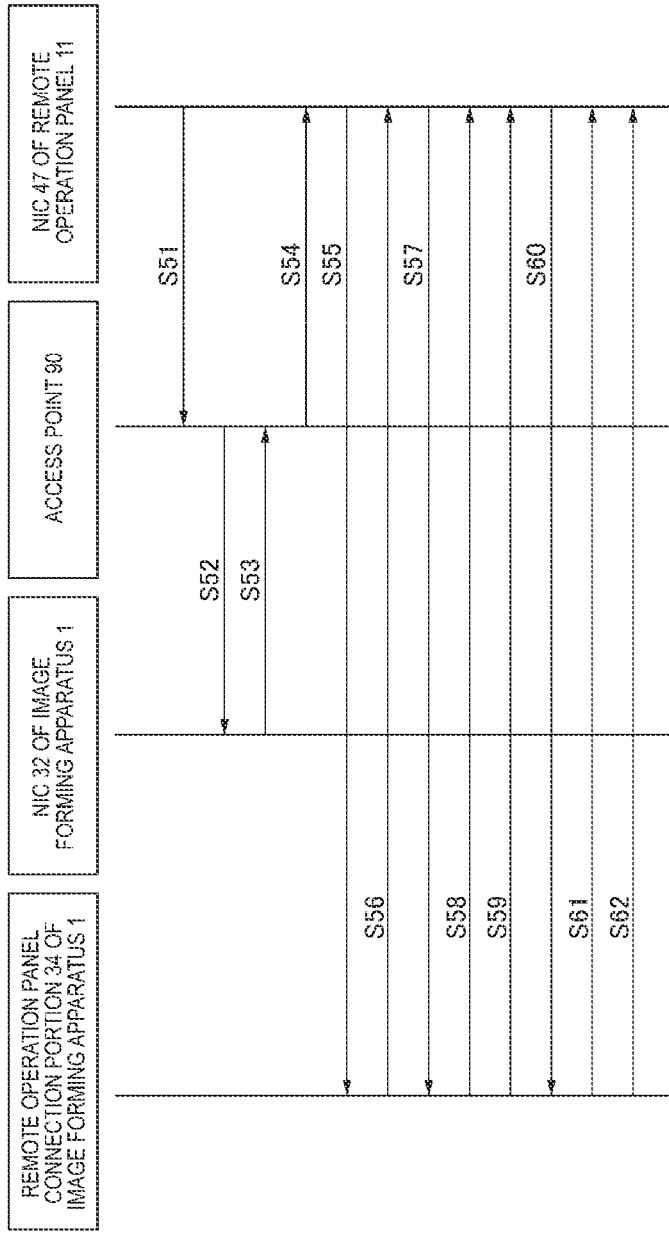
FIG. 11 is a sequence diagram at the time of connecting the remote operation apparatus and the image forming apparatus in the image forming system according to the embodiment of the present disclosure.

The communication processing illustrated in FIG. 11 is started at a timing when a selection instruction for the image forming apparatus 1 selected by the user and a connection instruction for the selected image forming apparatus 1 are input from the operation input unit 13 to the CPU 46 of the remote operation panel 11.

First, under the control of the CPU 46, the NIC 47 of the remote operation panel 11 transmits a connection demand signal for demanding connection to the image forming apparatus 1 selected by the user to the access point 90 via the LAN 33 (S51).

Next, the access point 90 transmits a connection demand signal received from the NIC 47 to the NIC 32 of the image forming apparatus 1 via the LAN 33 (S52). The CPU 28 determines whether connection is possible or impossible based on a connection demand signal input from the NIC 32.

Next, the NIC 32 transmits, to the access point 90 via the LAN 33, a connection possible/impossible signal for issuing a notification on connection possible/impossible based on the determination result in the CPU 28 (S53). At this time, in a case where connection is possible, the NIC 32 transmits a connection possible/impossible signal including information of the remote operation panel connection unit 34. The information of the remote operation panel connection unit 34 is, for example, an IP address and the like.

Next, the access point 90 transmits a connection possible/impossible signal received from the NIC 32 to the NIC 47 (S54).

Next, the CPU 46 executes a connection sequence with the remote operation panel connection unit 34 of the image forming apparatus 1 when receiving a connection possible/impossible signal issuing a notification that connection is possible by the NIC 47. As a result, the NIC 47 transmits a negotiation demand to the remote operation panel connection unit 34 (S55).

Next, in a case where there is no problem in the received negotiation demand, the remote operation panel connection unit 34 transmits a response signal to the NIC 47 (S56). Communication between the image forming apparatus 1 and the remote operation panel 11 is established when the MC 47 receives a response signal.

Next, the NIC 47 and the remote operation panel connection unit 34 transmit and receive information on communication conditions such as a communication speed and a compression rate of an image to and from each other (S57 and S58). As a result, each of the CPU 46 and the CPU 28 performs setting according to the communication conditions.

Next, the remote operation panel connection unit 34 transmits an image signal to the NIC 47 in a case where communication is ready (S59).

Next, the NIC 47 outputs the image signal received from the remote operation panel connection unit 34 to the CPU 46. Then, the CPU 46 performs control to switch from the image of the image data stored in the ROM 49 to the image of the image signal input from the NIC 47 and display the image on the operation input unit 13.

Next, under the control of the CPU 46, the NIC 47 transmits the coordinate information of the operation input unit 13 operated by the user and the state information of the remote operation panel 11 to the remote operation panel connection unit 34 (S60). Then, the remote operation panel connection unit 34 outputs the state information of the remote operation panel 11 received from the NIC 47 to the CPU 28. Furthermore, the CPU 28 performs an action on the received information on the state of the remote operation panel 11, and performs control to appropriately change and transmit image information to be transmitted to the remote operation panel connection unit 34.

Next, under the control of the CPU 28, the remote operation panel connection unit 34 appropriately changes the image information and transmits the image information to the NIC 47 (S61).

In addition, the remote operation panel connection unit 34 transmits, to the NIC 47, a command for turning on or blinking the LED of a state display unit 54 or a command for turning on/off the sound output from the operation sound generation unit 15 (S62).

In the communication processing described above, the remote operation panel 11 is connected to the image forming apparatus 1 when receiving the connection possible/impossible signal issuing a notification that connection is possible, but may directly transmit a connection demand to the image forming apparatus 1 without performing the processing of steps S51 to S54.

In this case, the remote operation panel 11 transmits a connection demand to the image forming apparatus 1 based on the information of the remote operation panel connection unit 34 stored in the ROM 49. In addition, the image forming apparatus 1 determines whether or not connection is possible when receiving the connection demand, and starts the processing of step S55 and subsequent steps when determining that connection is possible. Furthermore, since the remote operation panel 11 does not perform the processing of steps S51 to S54, it cannot be determined in advance that connection to the image forming apparatus 1 cannot be made. Therefore, the remote operation panel 11 independently determines that the connection is impossible because the connection to the image forming apparatus 1 cannot be made, and displays that the connection is impossible on the operation input unit 13.

Note that the remote operation panel 11 may only display that connection to the image forming apparatus 1 is impossible on the operation input unit 13 without determining that connection to the image forming apparatus 1 is impossible. In this case, the user determines that the image forming apparatus 1 cannot be connected based on the display of the operation input unit 13.

Figure 12:
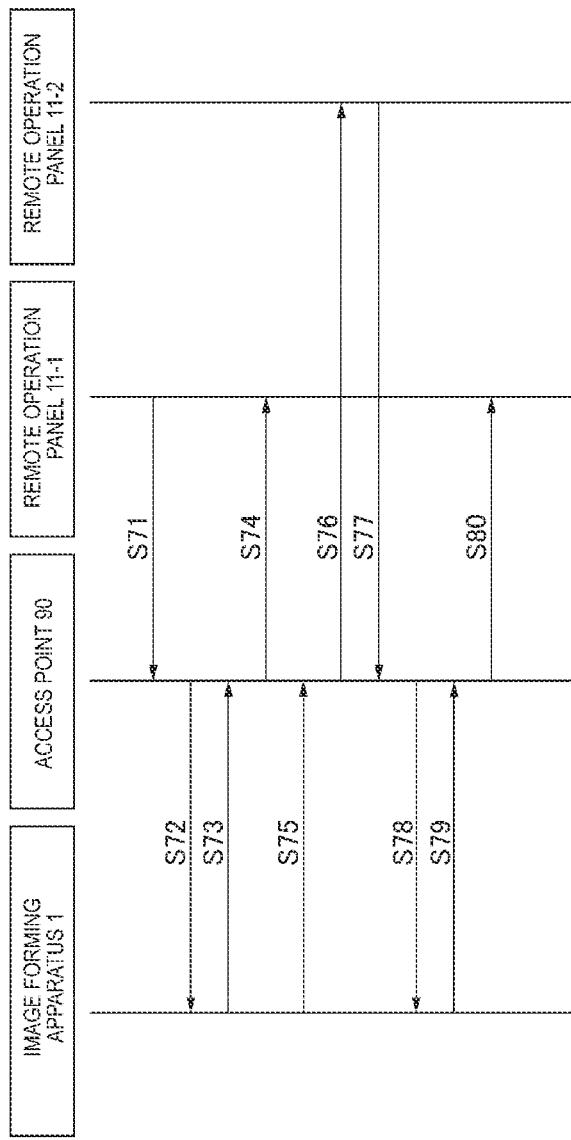
FIG. 12 is a sequence diagram of communication between a locked image forming apparatus and the remote operation apparatus in the image forming system according to the embodiment of the present disclosure.

Subsequently, communication processing when a remote operation panel 11-1 makes a connection demand to the image forming apparatus 1 in a situation where a remote operation panel 11-2 locks the image forming apparatus 1 will be described in detail with reference to FIG. 12.

First, the NIC 47 of the remote operation panel 11-1 transmits a connection demand for the image forming apparatus 1 to the access point 90 (S71).

Next, the access point 90 transmits a connection demand received from the NIC 47 of the remote operation panel 11-1 to the image forming apparatus 1 (S72).

Next, since the remote operation panel connection unit 34 of the image forming apparatus 1 is locked by the remote operation panel 11-2, the remote operation panel connection unit 34 transmits a signal indicating that connection is impossible to the access point 90 (S73).

Next, the access point 90 transmits, to the remote operation panel 11-1, a signal indicating that connection is impossible, received from the remote operation panel connection unit 34 (S74).

Next, the remote operation panel connection unit 34 transmits a signal indicating that a connection demand has been made to the access point 90 (S75).

Next, the access point 90 transmits, to the remote operation panel 11-2, a signal indicating that there is a connection demand received from the remote operation panel connection unit 34 (S76). Note that the processing in step S75 and the processing in step S76 may be executed only in a case where there is a lock release demand from the remote operation panel 11-1.

Next, in a case where permission to release the lock is selected in the CPU 46, the remote operation panel 11-2 transmits a signal indicating permission to release the lock from the NIC 47 to the access point 90 (S77).

Next, the access point 90 transmits, to the image forming apparatus 1, a signal indicating permission to release the lock received from the NIC 47 of the remote operation panel 11-2 (S78).

Next, the image forming apparatus 1 releases the lock and transmits a signal indicating that the lock has been released from the remote operation panel connection unit 34 to the access point 90 (S79).

Next, the access point 90 transmits, to the remote operation panel 11-1, a signal indicating that the lock has been released received from the remote operation panel connection unit 34 (S80).

Note that, thereafter, when receiving a connection demand from the remote operation panel 11-1, the image forming apparatus 1 executes the communication processing illustrated in FIG. 11.

As described above, the remote operation panel connection unit 34 of the image forming apparatus 1 is not connected to the remote operation panel 11-1 until connection to the remote operation panel 11-1 becomes possible, and does not transmit image data of an image to be displayed on the remote operation panel 11-1.

In a case where the lock is released due to timeout after the lock time has elapsed, the remote operation panel connection unit 34 transmits a signal issuing a notification that the lock has been released, instead of the signal indicating that the connection demand has been made, in the processing of step S75 and the processing of step S76.

When requesting the lock again, the remote operation panel 11-2 transmits a signal indicating the lock demand from the NIC 47 to the image forming apparatus 1 via the access point 90. Then, the image forming apparatus 1 performs lock processing and transmits a signal indicating that locking has been performed to the remote operation panel 11-2 via the access point 90.

Figure 13:
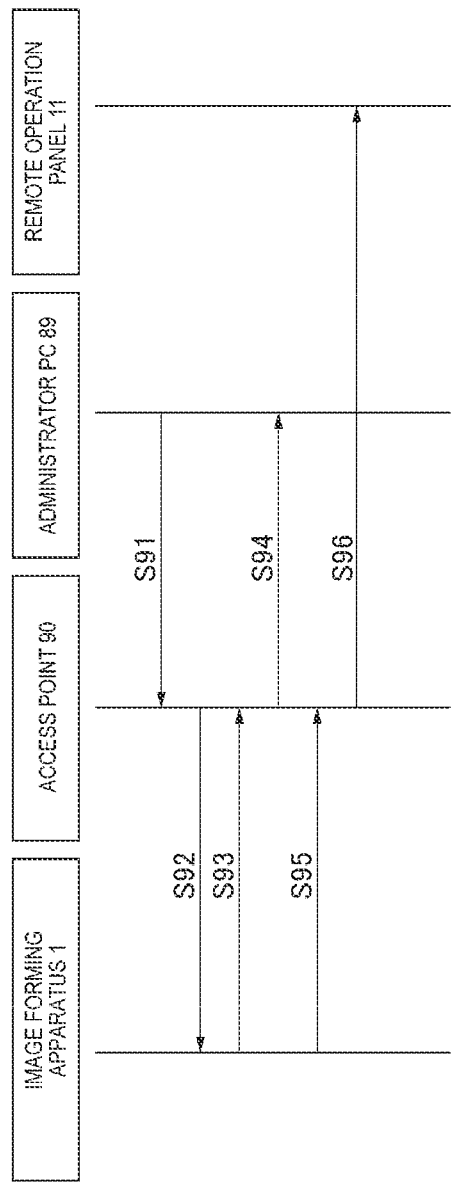
FIG. 13 is a sequence diagram at the time of releasing a lock of the locked image forming apparatus from an administrator PC in the image forming system according to the embodiment of the present disclosure.

Subsequently, communication processing when the administrator PC 89 releases the lock of the image forming apparatus 1 locked by the remote operation panel 11 will be described in detail with reference to FIG. 13.

First, the administrator PC 89 transmits a lock release request for the image forming apparatus 1 to the access point 90 (S91).

Next, the access point 90 transmits the lock release request received from the administrator PC 89 to the image forming apparatus 1 (S92).

Next, the image forming apparatus 1 performs lock release processing for releasing the lock, and transmits, to the access point 90, a signal issuing a notification that the lock release processing has been performed on the administrator PC 89 (S93).

Next, the access point 90 transmits a signal issuing a notification that the lock release processing has been performed to the administrator PC 89 (S94).

Next, the image forming apparatus 1 transmits, from the remote operation panel connection unit 34 to the access point 90, a signal indicating that lock of the remote operation panel 11 that has transmitted the lock instruction has been released (S95).

Next, the access point 90 transmits, to the remote operation panel 11, a signal indicating that the lock has been released received from the remote operation panel connection unit 34 (S96).

In this manner, the setting and release of the lock can be performed not only by the remote operation panel 11 but also by the administrator PC 89.

<Management of Time Schedule>

The management of the time schedule in the image forming system 100 according to the embodiment of the present disclosure will be described in detail with reference to FIGS. 14 to 16C.

In the above communication processing, the image forming apparatus 1 determines whether or not the connection between the image forming apparatus 1 and the remote operation panel 11 is possible or impossible. However, the server 84 or the administrator PC 89 may determine whether or not the connection is possible and restrict the connection in a case where the determination result indicates that the connection is impossible. In this case, the server 84 or the administrator PC 89 may transmit information necessary for connection between the image forming apparatus 1 and the remote operation panel 11 to the image forming apparatus 1 and the remote operation panel 11 to start connection between the remote operation panel 11 and the image forming apparatus 1. In a case where the server 84 or the administrator PC 89 manages the connection state, management can be performed by a time schedule illustrated in FIG. 14 as an example.

Figure 14:
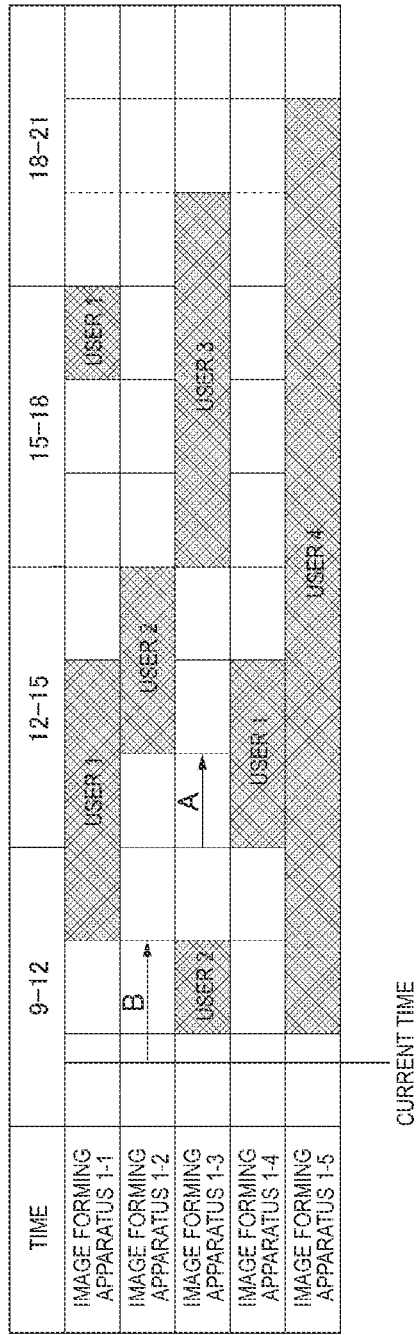
FIG. 14 is a diagram illustrating an example of a connection management method between the image forming apparatus and a remote operation panel in the image forming system according to the embodiment of the present disclosure.

FIG. 14 assumes an environment in which four users 1 to 4 use five image forming apparatuses 1-1 to 1-5. It is assumed that each of the users 1 to 4 has the remote operation panel 11. Each of the users 1 to 4 reserves the image forming apparatuses 1-1 to 1-5 for the time schedule divided into four time zones.

Each of the users 1 to 4 uses the server 84 or the administrator PC 89 to determine whether or not connection to each of the image forming apparatuses 1-1 to 1-5 is possible, and connects to the image forming apparatuses 1-1 to 1-5 according to the determination result to use the image forming apparatuses 1-1 to 1-5. In addition, the image forming apparatuses 1-1 to 1-5 scheduled to be used by the users 1 to 4 are controlled in a manner that the users 1 to 4 other than the users 1 to 4 scheduled to use the apparatuses cannot be connected.

In this manner, in an environment where the use of the image forming apparatuses 1-1 to 1-5 is managed, for example, the user 1 can newly reserve a use period A and the user 2 can reserve a use period B from the current time. Although the use time is set in the case of FIG. 14, the start time may be limited to the current time in a case where the end time cannot be guaranteed only by the connection between the remote operation panel 11 and the image forming apparatuses 1-1 to 1-5 in the case of continuous use or printing.

Figure 15:
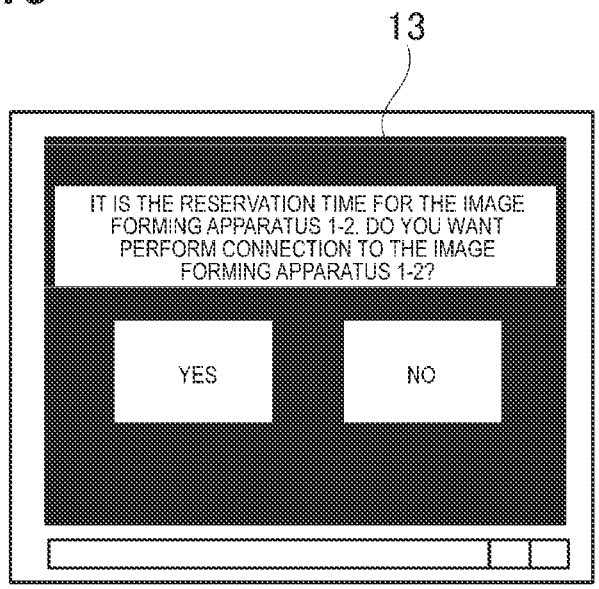
FIG. 15 is a diagram illustrating an example of a display screen of the remote operation apparatus according to the embodiment of the present disclosure when it is time to use the image forming apparatus.

When it is the reserved use period, the server 84 or the administrator PC 89 may communicate with the target remote operation panel 11 and display a selection screen as to whether or not to start the connection illustrated in FIG. 15 on the operation input unit 13 of the remote operation panel 11. The reason why the selection screen illustrated in FIG. 15 is displayed is that, for example, in a case where a plurality of image forming apparatuses 1-1 to 1-5 is reserved at the same time like the user 1 in the time schedule illustrated in FIG. 14, there is a possibility that the work is interrupted if the connection is switched. Note that, in a case where the plurality of image forming apparatuses 1-1 to 1-5 cannot be reserved, the connection may be automatically switched from the image forming apparatuses 1-1 to 1-5 without displaying the selection screen illustrated in FIG. 15.

As described above, by enabling the unconnected image forming apparatus 1 to be locked, the unconnected image forming apparatus 1 can be prevented from being used by another user, and different image forming apparatuses 1 can be continuously used.

In addition, the remote operation panel 11 may limit the number of image forming apparatuses 1 that can be locked by one remote operation panel 11. In this case, the remote operation panel 11 may cause the operation input unit 13 to display a display for checking "Connect", "Lock", and "Lock state" as illustrated in FIG. 16A.

When the "Lock state" is selected in the display of FIG. 16A, the remote operation panel 11 may cause the operation input unit 13 to display the target image forming apparatus 1, the lock time until the lock release, the lock release button, and the remaining number of lockable apparatuses, as illustrated in FIG. 16B. In this case, in a case where the lock is performed up to the upper limit of the number of lockable apparatuses, as illustrated in FIG. 16C, the display of "Lock" may be grayed out in a manner that "Lock" cannot be selected.

In this manner, by restricting the number of lockable apparatuses in a manner that locking cannot be performed more than necessary, it is possible to continuously use the image forming apparatus 1 while selecting the image forming apparatus 1 that can be efficiently used by a plurality of users.

In the present embodiment, in a case where it is set to restrict the connection between the image forming apparatus 1 and another remote operation panel 11, the connection between the image forming apparatus 1 and another remote operation panel 11 is restricted. As a result, it is possible prevent another user from first using an image forming apparatus 1 that is to be used next by the user in a case where the user wants to continuously use a plurality of different image forming apparatuses 1.

It goes without saying that some embodiments are not limited to the above embodiment, and various modifications can be made without departing from the gist of the present disclosure.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-012751, which was filed on Jan. 31, 2022 and which is hereby incorporated by reference herein in its entirety.

What is claimed is:

1. A remote operation apparatus that remotely operates an image forming apparatus, the remote operation apparatus comprising:
    a communication unit configured to communicate with the image forming apparatus; and
    a controller configured to:
        set whether or not to restrict connection between the image forming apparatus and another remote operation apparatus other than the remote operation apparatus; and
        give an instruction to restrict the connection between the image forming apparatus and the another remote operation apparatus before causing the image forming apparatus to form an image in a case where restriction of the connection between the image forming apparatus and the another remote operation apparatus is set,
    wherein the communication unit is configured to receive a release notification from the image forming apparatus, the release notification indicating releasing of the restriction of the connection to the another remote operation apparatus, and
    wherein the controller demands the image forming apparatus again to restrict the connection to the another remote operation apparatus in a case where the release notification is received by the communication unit.

2. The remote operation apparatus according to claim 1, wherein
    the controller executes connection processing with the image forming apparatus in a case where connection to the image forming apparatus is possible.

3. The remote operation apparatus according to claim 1, wherein
    the controller sets a lock time that restricts the connection between the image forming apparatus and the another remote operation apparatus, and demands the image forming apparatus to restrict the connection to the another remote operation apparatus during the set lock time.

4. The remote operation apparatus according to claim 1, wherein
    the controller sets a number of image forming apparatuses to be restricted from being connected to the another remote operation apparatus, and demands the image forming apparatuses of the number to restrict connection to the another remote operation apparatus.

5. The remote operation apparatus according to claim 1, wherein
    the controller demands the image forming apparatus, having connection to the remote operation apparatus and being restricted, to release the restriction of the connection to the remote operation apparatus.

6. The remote operation apparatus according to claim 1, wherein
the controller gives the instruction to restrict the connection between the image forming apparatus and the another remote operation apparatus based on user information.

7. The remote operation apparatus according to claim 1, wherein
the controller gives the instruction to restrict the connection between the image forming apparatus and the another remote operation apparatus based on information of the remote operation apparatus.

8. A remote operation apparatus that remotely operates an image forming apparatus, the remote operation apparatus comprising:
a communication unit configured to communicate with the image forming apparatus; and
a controller configured to:
set whether or not to restrict connection between the image forming apparatus and another remote operation apparatus other than the remote operation apparatus; and
give an instruction to restrict the connection between the image forming apparatus and the another remote operation apparatus before causing the image forming apparatus to form an image in a case where restriction of the connection between the image forming apparatus and the another remote operation apparatus is set,
wherein the communication unit is configured to receive a demand notification that indicates that the image forming apparatus has received a demand for connection from the another remote operation apparatus,
wherein the controller sets whether or not to release the restriction of the connection between the image forming apparatus and the another remote operation apparatus in a case where the communication unit receives the demand notification, and
wherein the controller performs a restriction release request that releases the restriction of the connection between the image forming apparatus and to the another remote operation apparatus to the image forming apparatus in a case where release of the restriction of the connection between the image forming apparatus and the another remote operation apparatus is set.

9. The remote operation apparatus according to claim 8, wherein
the controller executes connection processing with the image forming apparatus in a case where connection to the image forming apparatus is possible.

10. The remote operation apparatus according to claim 8, wherein
the controller sets a lock time that restricts the connection between the image forming apparatus and the another remote operation apparatus, and demands the image forming apparatus to restrict the connection to the another remote operation apparatus during the set lock time.

11. The remote operation apparatus according to claim 8, wherein
the controller sets a number of image forming apparatuses to be restricted from being connected to the another remote operation apparatus, and demands the image forming apparatuses of the number to restrict connection to the another remote operation apparatus.

12. The remote operation apparatus according to claim 8, wherein
the controller demands the image forming apparatus, having connection to the remote operation apparatus and being restricted, to release the restriction of the connection to the remote operation apparatus.

13. The remote operation apparatus according to claim 8, wherein
the controller gives the instruction to restrict the connection between the image forming apparatus and the another remote operation apparatus based on user information.

14. The remote operation apparatus according to claim 8, wherein
the controller gives the instruction to restrict the connection between the image forming apparatus and the another remote operation apparatus based on information of the remote operation apparatus.

* * * * *